(12) United States Patent
Saito et al.

(10) Patent No.: US 11,214,709 B2
(45) Date of Patent: Jan. 4, 2022

(54) POLYAMIDEIMIDE RESIN AND COATING MATERIAL

(71) Applicant: HITACHI CHEMICAL COMPANY, LTD., Tokyo (JP)

(72) Inventors: Yasuyuki Saito, Hitachi (JP); Atsushi Takahashi, Hitachi (JP); Yuta Harada, Chiba (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 0 days.

(21) Appl. No.: 15/781,224

(22) PCT Filed: Dec. 5, 2016

(86) PCT No.: PCT/JP2016/086036
§ 371 (c)(1),
(2) Date: Jun. 4, 2018

(87) PCT Pub. No.: WO2017/104461
PCT Pub. Date: Jun. 22, 2017

(65) Prior Publication Data
US 2018/0320022 A1  Nov. 8, 2018

(30) Foreign Application Priority Data

Dec. 14, 2015 (JP) .............................. JP2015-243133

(51) Int. Cl.
| | |
|---|---|
| *C09D 179/08* | (2006.01) |
| *C09D 7/40* | (2018.01) |
| *C08G 18/10* | (2006.01) |
| *C08G 73/14* | (2006.01) |
| *C08G 73/10* | (2006.01) |
| *C08G 18/34* | (2006.01) |
| *C08G 18/76* | (2006.01) |
| *C09D 7/65* | (2018.01) |

(52) U.S. Cl.
CPC ........... *C09D 179/08* (2013.01); *C08G 18/10* (2013.01); *C08G 18/34* (2013.01); *C08G 18/345* (2013.01); *C08G 18/7671* (2013.01); *C08G 18/7685* (2013.01); *C08G 73/1035* (2013.01); *C08G 73/1067* (2013.01); *C08G 73/14* (2013.01); *C09D 7/40* (2018.01); *C09D 7/65* (2018.01)

(58) Field of Classification Search
CPC ........ C08L 79/08; C09D 179/08; C08G 73/14
See application file for complete search history.

(56) References Cited

U.S. PATENT DOCUMENTS

| | | | | |
|---|---|---|---|---|
| 2012/0222889 A1* | 9/2012 | Davis | .................. | C08G 18/345 174/254 |
| 2015/0299393 A1* | 10/2015 | Kelly | ..................... | C08G 73/14 528/53 |
| 2015/0299513 A1* | 10/2015 | Kelly | .................... | C09D 179/08 524/96 |
| 2016/0002408 A1* | 1/2016 | Sidenstick | ........... | C09D 179/08 528/49 |

FOREIGN PATENT DOCUMENTS

| | | | |
|---|---|---|---|
| JP | 5580426 | * | 6/1980 |
| JP | 62156122 | * | 7/1987 |
| JP | H04-039323 A | | 2/1992 |
| JP | 2007-146101 A | | 6/2007 |
| JP | 2007-146141 | * | 6/2013 |
| JP | 2014-240450 A | | 12/2014 |
| JP | 2015-522660 A | | 8/2015 |

* cited by examiner

*Primary Examiner* — Gregory Listvoyb
(74) *Attorney, Agent, or Firm* — Fitch, Even, Tabin & Flannery, L.L.P.

(57) ABSTRACT

A polyamideimide resin having isocyanate groups at the terminals, wherein at least a portion of the isocyanate groups are blocked with an ether group-containing cyclic amine.

15 Claims, No Drawings

POLYAMIDEIMIDE RESIN AND COATING MATERIAL

CROSS-REFERENCE TO RELATED APPLICATIONS

This application is a U.S. national phase application filed under 35 U.S.C. § 371 of International Application No. PCT/JP2016/086036, filed Dec. 5, 2016, designating the United States, which claims priority from Japanese Patent Application No. 2015-243133 filed Dec. 14, 2015, which are hereby incorporated herein by reference in their entirety.

TECHNICAL FIELD

Embodiments of the present invention relate to a polyamideimide resin and a coating material that uses the resin.

BACKGROUND ART

Polyamideimide resins have excellent heat resistance, chemical resistance and solvent resistance, and are therefore widely used as coating agents for all manner of substrates. For example, polyamideimide resins are used as varnishes for enameled wires and as heat-resistant coating materials and the like.

Polyamideimide resins are obtained by reacting a diisocyanate compound and an acid component such as a tribasic acid anhydride, and stabilizing the resins by blocking the terminal isocyanate groups with a blocking agent such as an alcohol, phenol, or oxime or the like is known (Patent Document 1). Furthermore, polyamideimide resins in which lactam structures have been added to the terminals using a blocking agent such as ε-caprolactam are also known (Patent Document 2).

PRIOR ART DOCUMENTS

Patent Documents

Patent Document 1: JP 2007-146101 A
Patent Document 2: JP 2014-240450 A

SUMMARY OF INVENTION

Problems Invention Aims to Solve

When a polyamideimide resin is used in a coating application as a coating material or the like, it is desirable that the elastic modulus of the coating film is high in order to enable relaxation of stress.

Embodiments of the present invention have the objects of providing a polyamideimide resin that can form a coating film having a high elastic modulus, and providing a coating material having superior storage stability that uses the resin.

Means for Solution of the Problems

The inventors of the present invention discovered that by selecting a specific blocking agent, both of the above objects could be achieved.

One embodiment of the present invention relates to a polyamideimide resin having isocyanate groups at the terminals, wherein at least a portion of the isocyanate groups are blocked with an ether group-containing cyclic amine.

Another embodiment relates to a coating material containing the polyamideimide resin of the embodiment described above and a solvent.

Yet another embodiment relates to a method for producing a polyamideimide resin that includes a step of reacting a diisocyanate compound and a tribasic acid anhydride and/or a tribasic acid halide in a solvent containing an ether group-containing cyclic amine.

Effects of the Invention

The polyamideimide resin of an embodiment of the present invention has the terminal isocyanate groups blocked with an ether group-containing cyclic amine, and can therefore provide a coating material having excellent storage stability, and that coating material can be used to form a coating film having a high elastic modulus. Further, the ether group-containing cyclic amine offers the advantage of being able to also be used as the polymerization solvent for the polyamideimide resin and the solvent for the coating material, and therefore the method for producing a polyamideimide resin according to an embodiment of the present invention enables the polyamideimide resin to be synthesized using a solvent containing the ether group-containing cyclic amine, and the resulting polyamideimide resin solution can be used, as is, as a coating material or the like.

Embodiments for Carrying Out the Invention

Preferred embodiments are described below.
1. Polyamideimide Resin
A feature of the polyamideimide resin is the blocking of at least a portion of the terminal isocyanate groups with an ether group-containing cyclic amine.

The polyamideimide resin according to one embodiment is a resin obtained by reacting a diisocyanate compound with an acid component composed of a tribasic acid anhydride or a tribasic acid halide. An arbitrary combination of a plurality of compounds may be used for each of these raw material compounds.

For example, a polyamideimide resin containing a structural unit represented by the general formula shown below and having isocyanate groups at the terminals may be used.

[Chemical formula 1]

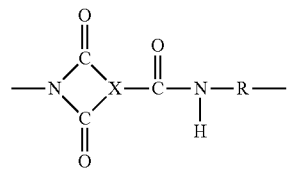

(I)

In general formula (I), X represents a residue that excludes the acid anhydride group of the tribasic acid anhydride (or the acid halide group) and a carboxyl group, and R represents a residue that excludes the isocyanate group of the diisocyanate.

There are no particular limitations on the diisocyanate compound, and suitable examples include 4,4'-diphenylmethane diisocyanate, xylylene diisocyanate, 3,3'-diphenylmethane diisocyanate, 3,3'-dimethoxylbiphenyl-4,4'-diisocyanate, para-phenylene diisocyanate, hexamethylene diisocyanate, tolylene diisocyanate, and naphthalene diisocyanate. From the viewpoint of reactivity, the use of 4,4'-diphenylmethane diisocyanate is preferred.

In one embodiment, the polyamideimide resin may be produced using a diamine compound in addition to the diisocyanate. Examples of the diamine compound include 4,4'-diaminodiphenylmethane, 4,4'-diaminodiphenyl ether, 4,4'-diaminodiphenylsulfone, 3,3'-diaminodiphenylsulfone, xylylenediamine and phenylenediamine.

Although there are no particular limitations on the tribasic acid anhydride, trimellitic anhydride is preferred, and although there are no particular limitations on the tribasic acid halide, tribasic acid chlorides are preferred, and examples include trimellitic anhydride chloride (anhydrotrimellitic acid chloride) or the like. From the viewpoint of reducing environmental impact, the use of trimellitic anhydride or the like is preferred.

Besides the tribasic acid anhydride (or tribasic acid chloride) described above, other saturated or unsaturated polybasic acids such as dicarboxylic acids and tetracarboxylic dianhydrides may also be used as the acid component, provided they do not impair the properties of the polyamideimide resin.

There are no particular limitations on the dicarboxylic acids, and examples include terephthalic acid, isophthalic acid, adipic acid and sebacic acid. There are also no particular limitations on the tetracarboxylic dianhydrides, and examples include pyromellitic dianhydride, benzophenone tetracarboxylic dianhydride and biphenyl tetracarboxylic dianhydride. These compounds may be used individually, or an arbitrary combination of a plurality of compounds may be used.

From the viewpoint of maintaining the properties of the polyamideimide resin, the total amount of carboxylic acids (dicarboxylic acids and tetracarboxylic acids) other than the tribasic acid is preferably within a range from 0 to 30 mol % of all the carboxylic acids.

In one preferred embodiment, the polyamideimide resin has a structural unit represented by a general formula (II) shown below.

[Chemical formula 2]

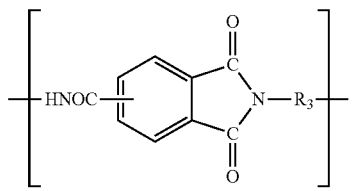
(II)

In general formula (II), $R_3$ represents a residue that excludes the isocyanate group of the diisocyanate (or the amino group of the optionally used diamine).

From the viewpoint of the molecular weight and the crosslinking degree of the produced polyamideimide resin, the usage ratio between the diisocyanate and the acid component (the total of the tribasic acid anhydride or tribasic acid halide, and any dicarboxylic acids and tetracarboxylic dianhydrides that may be used as required) is set so that for each 1.0 mol of the total of all the acid components, the amount of the diisocyanate compound (and any optionally used diamine compound) is preferably within a range from 0.8 to 1.1 mol, more preferably from 0.95 to 1.08 mol, and even more preferably from 1.0 to 1.08 mol.

The polyamideimide resin may be modified by reacting a polyhydric alcohol with the isocyanate. Examples of polyhydric alcohols that may be used include dihydric alcohols such as ethylene glycol, diethylene glycol, triethylene glycol and propylene glycol, and polyhydric alcohols such as glycerol, trimethylolpropane, diglycerol and triglycerol.

The ether group-containing cyclic amine that functions as the blocking agent for the terminal isocyanate groups is preferably a heterocyclic amine containing an ether group, wherein the ether group is a cyclic ether. Accordingly, the ether group-containing cyclic amine is preferably a saturated heterocyclic compound containing nitrogen and oxygen as hetero atoms.

The ring is preferably a 4-membered to 7-membered ring, and is more preferably a 5-membered or 6-membered ring.

More specifically, compounds having a tetrahydro-1,4-oxazine (morpholine) ring, a tetrahydro-1,3-oxazine ring, a tetrahydro-1,2-oxazine ring or an oxazolidine ring are preferred. These heterocyclic compounds may have an optional substituent such as an alkyl group, formyl group or acetyl group, and the substituent preferably substitutes the hydrogen atom on the N atom.

With conventional blocking agents, the blocking process does not change the elastic modulus of the coating film, but the blocking agent of the present embodiment can enhance the coating film elastic modulus as a result of the blocking.

Examples of preferred compounds include tetrahydro-1, 4-oxazine (morpholine), 4-methylmorpholine, 4-ethylmorpholine, N-formylmorpholine and N-acetylmorpholine. A combination of a plurality of these compounds may also be used.

Although there are no particular limitations on the blocking by the blocking agent, for 1 mol of the polyamideimide resin, blocking is preferably performed with at least 0.05 mol of the ether group-containing cyclic amine in order to obtain a satisfactory blocking effect, whereas from the viewpoint of ensuring better heat resistance and curability for the resin, blocking is preferably performed with not more than 0.15 mol of the ether group-containing cyclic amine.

There are numerous possible synthesis conditions for the polyamideimide resin, and although there are no particular limitations on the conditions, examples of the most representative methods for reacting the diisocyanate and the tribasic acid anhydride include the method disclosed in JP H04-39323 A. Similarly, there are no particular limitations on the blocking method, and the blocking agent may be reacted during synthesis of the resin, or may be reacted after synthesis of the resin.

When the blocking agent is reacted during synthesis of the resin, then as described below, the ether group-containing cyclic amine may be used as part or all of the polymerization solvent. Using the ether group-containing cyclic amine as the polymerization solvent enables synthesis and blocking of the resin to be performed in a single step, and is also preferred in terms of enabling the ether group-containing cyclic amine to be used, as is, as the coating material solvent.

When blocking is performed after synthesis of the polyamideimide resin, the resin may be first synthesized, either in a solventless environment or in another polymerization solvent, and the ether group-containing cyclic amine may subsequently be added and reacted. There are no particular limitations on other polymerization solvents that can be used, and examples include N-methyl-2-pyrrolidone, N,N'-dimethylethyleneurea, N,N-dimethylacetamide or N,N-dimethylformamide and γ-butyrolactone, and appropriate combinations of two or more of these solvents may also be used.

From the viewpoint of ensuring favorable coating film strength, the number average molecular weight of the polyamideimide resin is preferably at least 12,000, and more preferably 15,000 or greater. On the other hand, in order to facilitate easier coating material formation when the resin is used as a coating material or the like, and achieve a viscosity that is suitable for application, the number average molecular weight is preferably not more than 30,000, and more preferably 25,000 or less.

The number average molecular weight of the polyamideimide resin can be controlled within the above range by performing sampling during the resin synthesis, measuring the molecular weight using an analytical instrument such as a gel permeation chromatograph (GPC) (in the case of GPC, performing the measurement using a calibration curve prepared using standard polystyrenes), and continuing the synthesis until the targeted number average molecular weight has been achieved.

The polyamideimide resin can be used in various manners of applications. For example, the polyamideimide resin can be used favorably as a binder resin for various manners of protective and covering materials or as a resin for films which require slipperiness, including coating materials or coating agents such as heat-resistant coating materials and coating materials for sliding members, and can also be used favorably in applications for molded items that are molded into belt-like shapes, such as the circular belts that are used as intermediate transfer belts in copying machines. These applications are all non-adhesive applications.

The polyamideimide resin according to an embodiment of the present invention has terminals that have been blocked with the ether group-containing cyclic amine compound, and these blocks can be detached by heating. In order to obtain a coating film of superior toughness, or ensure favorable adhesion to aluminum substrates and steel substrates and the like, the reaction temperature during coating film formation is preferably at least 250° C. However, when used in a film-based application, because substrate films such as polyethylene terephthalate shrink at high temperatures, a film having less shrinkage and superior toughness can be obtained by first curing the coating film at a temperature of less than 250° C., and following removal of the coating film from the substrate film, subjecting the coating film to further curing at 250° C. or higher.

2. Coating Material

The polyamideimide resin coating material contains at least the blocked polyamideimide resin described above and a solvent. This solvent is also referred to as the "coating material solvent".

In order to ensure that the functions of the polyamideimide resin manifest satisfactorily, the coating material preferably contains from 10 to 50% by mass of the polyamideimide resin. A combination of a plurality of types of the polyamideimide resin may also be used, and the polyamideimide resin may also include a portion of unblocked polyamideimide resin.

<Solvent>

There are no particular limitations on the solvent, provided it is capable of dissolving or dispersing the polyamideimide resin, but in one embodiment, the use of an organic solvent is preferred.

Examples of solvents that can be used favorably include polar solvents such as N-methyl-2-pyrrolidone, N,N'-dimethylformamide, 1,3-dimethylimidazolidinone and 4-morpholinecarbaldehyde; aromatic hydrocarbons such as xylene and toluene; and ketones such as methyl ethyl ketone, methyl isobutyl ketone, γ-butyrolactone and δ-valerolactone. A combination of these solvents may also be used.

The coating material solvent preferably includes the ether group-containing cyclic amine described above. Because the ether group-containing cyclic amine is added to the terminals of the polyamideimide resin, ensuring that a large amount of a solvent of the same polarity exists improves the storage stability, and because the crystallinity is also increased, the alignment of the polymer molecules upon curing of the coating film also improves, thereby increasing the elastic modulus of the film.

For these reasons, the amount of the ether group-containing cyclic amine in the coating material solvent is preferably 50 to 100% by mass of the total solvent composition. If the coating material solvent is composed solely of the ether group-containing cyclic amine (namely, 100% by mass), then the polarities of the polyamideimide resin terminals and the solvent are the same, which is most desirable in terms of the storage stability of the coating material and the improvement in the elastic modulus of the coating film.

This coating material solution may simply use the polymerization solvent used in the production of the polyamideimide resin, or a different solvent from the polymerization solvent may be added to adjust the viscosity appropriately. In other words, during preparation of the coating material, the polyamideimide resin solution obtained in the synthesis of the polyamideimide resin can be used, as is, with appropriate addition of another coating material solvent as required.

<Other Components>

The polyamideimide resin coating material may also contain a curing agent in addition to the polyamideimide resin and the solvent described above. Although there are no particular limitations on the curing agent, epoxy resins (epoxy compounds), phenol resins, melamine resins (melamine compounds), and isocyanate compounds and the like can be used favorably, and among these, the use of an epoxy resin (epoxy compound) is preferred. By adding an epoxy resin, the thermal, mechanical and electrical properties of the polyamideimide resin can be further improved. Further, epoxy resins (epoxy compounds), melamine resins (melamine compounds) and isocyanate compounds can also further enhance the adhesion of the coating film, and are consequently preferred.

In addition to the curing agent, if required, polyethersulfone resins, polyimide resins, polyamide resins, or fluororesins or the like may also be used, either individually or in mixtures.

There are no particular limitations on the epoxy resin (epoxy compound), and examples include triglycidyl isocyanurate, bisphenol-A epoxy resins, bisphenol-F epoxy resins, bisphenol-S epoxy resins, brominated bisphenol-A epoxy resins, biphenyl epoxy resins, phenol novolac epoxy resins, cresol novolac epoxy resins, brominated phenol novolac epoxy resins, bisphenol-A novolac epoxy resins, naphthalene skeleton-containing epoxy resins, aralkylene skeleton-containing epoxy resins, biphenyl-aralkylene skeleton-containing epoxy resins, phenol salicylaldehyde novolac epoxy resins, lower alkyl group-substituted phenol salicylaldehyde novolac epoxy resins, dicyclopentadiene skeleton-containing epoxy resins, glycidylamine epoxy resins and alicyclic epoxy resins. These epoxy compounds may be used individually, or a mixture of two or more compounds may be used.

The epoxy resin may be added alone and reacted with the polyamideimide resin, but may also be added together with a curing agent or a curing accelerator for the epoxy resin so that residual unreacted epoxy resin is not retained after curing.

There are no particular limitations on the melamine compounds, and examples include methylol group-containing compounds obtained by reacting melamine with formaldehyde or para-formaldehyde or the like. These methylol groups are preferably etherified with an alcohol having 1 to 6 carbon atoms.

Examples of the isocyanate compounds include polyisocyanates of hexamethylene diisocyanate such as Duranate, and polyisocyanates synthesized from 4,4'-diphenylmethane diisocyanate. The weight average molecular weight of these polyisocyanates is preferably from 500 to 9,000, and more preferably from 1,000 to 5,000.

In terms of the amounts of these epoxy resins, isocyanate compounds and melamine compounds added to the coating material, from the viewpoint of ensuring a satisfactory adhesion improvement effect as a result of the addition while also ensuring satisfactory manifestation of the properties of the polyamideimide resin, or from the viewpoint of satisfactorily curing the polyamideimide resin while ensuring phase separation does not occur, the amount of each resin or compound is preferably from 1 to 40 parts by mass, and more preferably from 5 to 15 parts by mass, per 100 parts by mass of the polyamideimide resin.

Another resin may be mixed with the polyamideimide resin to form a polymer alloy. There are no particular limitations on the polymer alloying method, and a general mixing method using a lab stirrer or the like may be used. During mixing, because there is a possibility of gelling depending on the mixing time and temperature, the mixing is preferably conducted at a temperature of not more than 35° C. and completed within 2 hours.

The polyamideimide resin coating material may also contain other optional components. For example, conventional optional components used in typical coating materials may be added, including pigments, fillers, antifoaming agents, preservatives, lubricants, surfactants, antioxidants and ultraviolet absorbers.

There are no particular limitations on the surfactant, but a surfactant that ensures that the components for forming the coating film mix uniformly and do not separate (and form a separate layer) before drying of the coating film, and does not leave a large amount of residue following baking is preferred.

Although there are no particular limitations on the amount of the surfactant, in order to maintain a uniform mixed state, the amount of the surfactant in the coating material is preferably at least 0.01% by mass, and more preferably 0.5% by mass or greater. On the other hand, in order to ensure that a large amount of residual carbonized matter does not remain in the coating film upon baking, which has an adverse effect on the film formation properties, the amount of the surfactant in the coating material is preferably not more than 10% by mass, and more preferably 5% by mass or less.

In order to improve the water resistance and the like of the coating film, the coating material preferably also contains a filler if required.

The type of filler used can be selected in accordance with the intended application of the coating film, with due consideration of factors such as the water resistance and chemical resistance of the filler, and is preferably a filler that does not dissolve in water. Specific examples of the filler include metal powders, metal oxides (such as aluminum oxide, zinc oxide, tin oxide and titanium oxide), glass beads, glass flakes, glass particles, ceramics, silicon carbide, silicon oxide, calcium fluoride, carbon black, graphite, mica and barium sulfate. Any of these fillers may be used individually, or a combination of a plurality of fillers may be used.

There are no particular limitations on the coating method used for the coating material, and conventional coating methods such as dip coating, spray coating and brush application can be employed. The volume of solvent is preferably adjusted appropriately, with the concentration diluted to a level that is appropriate for the coating method.

Following application of the coating material, the material is dried (preliminary drying) and cured (firing) to form a coating film. The conditions for the drying and curing are not particularly limited, and are preferably set appropriately in accordance with the heat resistance of the substrate being used. In order to ensure favorable adhesion and toughness for the coating film, heating is preferably performed at 250° C. or higher.

3. Method for Producing Polyamideimide Resin

The method for producing a polyamideimide resin according to an embodiment of the present invention includes a step of reacting a diisocyanate compound and a tribasic acid anhydride and/or a tribasic acid halide in a solvent containing an ether group-containing cyclic amine.

The raw material compounds used are as described above in the section relating to the polyamideimide resin.

The ether group-containing cyclic amine used as the polymerization solvent is also as described above. By using the ether group-containing cyclic amine as the polymerization solvent, synthesis of the resin and blocking of the isocyanate groups can be performed in a single step. Moreover, because the ether group-containing cyclic amine is ideal as both the polyamideimide resin solution polymerization solvent and the coating material solvent, the obtained polymer solution can be used, as is, as a coating material or the like.

The amount of the ether group-containing cyclic amine in the polymerization solvent is preferably at least 50% by mass. In such cases, the resin solution obtained following polymerization can be used favorably, as is, as a coating material.

In other words, the ether group-containing cyclic amine may be used alone, or may be mixed with one or more other polar solvents. Examples of other polymerization solvents that may be used in combination include N-methyl-2-pyrrolidone, N,N'-dimethylethyleneurea, N,N-dimethylacetamide or N,N-dimethylformamide and γ-butyrolactone, and appropriate combinations of two or more of these solvents may also be used.

There are no particular limitations on the reaction temperature, which may be set appropriately in accordance with the boiling point of the polymerization solvent that is used. For example, when an N-alkylmorpholine is used as the ether group-containing cyclic amine for the polymerization solvent, the reaction is preferably performed at a temperature of 100 to 180° C.

In order to reduce the effect of moisture in the air, the polymerization reaction is preferably conducted under an atmosphere of nitrogen or the like.

The reaction between the acid component and the diisocyanate component can, for example, be produced using any of the following procedures.

(1) A method of synthesizing the polyamideimide resin by using and reacting the acid component and the diisocyanate component in a single batch.

(2) A method of reacting the acid component with an excess of the diisocyanate component to synthesize an amide-imide oligomer having isocyanate groups at the terminals, and then synthesizing the polyamideimide resin by adding additional acid component to react with the terminal isocyanate groups.

(3) A method of reacting an excess of the acid component with the diisocyanate component to synthesize an amide-imide oligomer having acid groups or acid anhydride groups at the terminals, and then synthesizing the polyamideimide resin by adding additional diisocyanate component to react with the terminal acid groups and/or acid anhydride groups.

EXAMPLES

A variety of examples are described below in detail, but the preferred embodiments of the invention are not limited to these examples, and of course also incorporate many embodiments other than these examples based on the scope of the present invention.

Example 1

A 2-liter flask fitted with a thermometer, a stirrer and a condenser was charged with 250.3 g (1.00 mol) of 4,4'-diphenylmethane diisocyanate, 192.1 g (1.00 mol) of trimellitic anhydride and 660 g of 4-methylmorpholine, while stirring the resulting mixture, the temperature was raised to 110° C. under a stream of dry nitrogen, the mixture was reacted for about 4 hours, and the reaction was continued for a further 6 hours while holding the temperature at 160° C., thus obtaining a blocked polyamideimide resin solution (solid fraction concentration: about 40% by mass) of a resin having a number average molecular weight of 19,000. NMR measurement of the obtained polyamideimide resin confirmed that the resin was blocked with 0.02 mol of 4-methylmorpholine per 1 mol of the resin.

The NMR measurement was performed under the following conditions, using a $^1$H-NMR apparatus manufactured by Bruker Corporation.

Standard: tetramethylsilane, 0 ppm
Solvent: dimethyl sulfoxide-d6
Frequency: 400 MHz
Temperature: 23° C.±3° C.

Further, for each synthesized resin, a material obtained by re-precipitation using acetone was used as the sample.

The number average molecular weight of the polyamideimide resin was measured under the following conditions.

GPC apparatus: Hitachi L6000
Detector: Hitachi L4000 UV
Wavelength: 270 nm
Data processing unit: ATT 8
Columns: Gelpack GL-S300MDT-5×2
Column size: 8 mmø×300 mm
Solvent: DMF/THF=1/1 (liter)+0.06 M phosphoric acid+0.06 M lithium bromide
Sample concentration: 5 mg/ml
Injection volume: 5 µl
Pressure: 49 kgf/cm$^2$ (4.8×10$^6$ Pa)
Flow rate: 1.0 ml/min Example 2

A 2-liter flask fitted with a thermometer, a stirrer and a condenser was charged with 125.2 g (0.5 mol) of 4,4'-diphenylmethane diisocyanate, 132.2 g (0.5 mol) of 3,3'-dimethyl-4,4'-diisocyanatobiphenyl, 192.1 g (1.0 mol) of trimellitic anhydride and 904 g of 4-methylmorpholine, while stirring the resulting mixture, the temperature was raised to 110° C. under a stream of dry nitrogen, the mixture was reacted for about 4 hours, and the reaction was continued for a further 6 hours while holding the temperature at 160° C., thus obtaining a blocked polyamideimide resin solution of a resin having a number average molecular weight of 20,000. NMR measurement of the obtained polyamideimide resin confirmed that the resin was blocked with 0.11 mol of 4-methylmorpholine per 1 mol of the resin.

Example 3

A 2-liter flask fitted with a thermometer, a stirrer and a condenser was charged with 125.2 g (0.5 mol) of 4,4'-diphenylmethane diisocyanate, 158.6 g (0.6 mol) of 3,3'-dimethyl-4,4'-diisocyanatobiphenyl, 192.1 g (1.0 mol) of trimellitic anhydride and 904 g of N-formylmorpholine, while stirring the resulting mixture, the temperature was raised to 110° C. under a stream of dry nitrogen, the mixture was reacted for about 4 hours, and the reaction was continued for a further 2 hours while holding the temperature at 160° C., thus obtaining a blocked polyamideimide resin solution of a resin having a number average molecular weight of 15,600. NMR measurement of the obtained polyamideimide resin confirmed that the resin was blocked with 0.15 mol of N-formylmorpholine per 1 mol of the resin.

Example 4

A 2-liter flask fitted with a thermometer, a stirrer and a condenser was charged with 257.5 g (1.02 mol) of 4,4'-diphenylmethane diisocyanate, 192.1 g (1.0 mol) of trimellitic anhydride and 660 g of N-formylmorpholine, while stirring the resulting mixture, the temperature was raised to 110° C. under a stream of dry nitrogen, the mixture was reacted for about 4 hours, and the reaction was continued for a further 4 hours while holding the temperature at 160° C., thus obtaining a blocked polyamideimide resin solution of a resin having a number average molecular weight of 23,000. NMR measurement of the obtained polyamideimide resin confirmed that the resin was blocked with 0.06 mol of N-formylmorpholine per 1 mol of the resin.

Comparative Example 1

A 2-liter flask fitted with a thermometer, a stirrer and a condenser was charged with 250.3 g (1.0 mol) of 4,4'-diphenylmethane diisocyanate, 192.1 g (1.0 mol) of trimellitic anhydride and 660 g of N-methyl-2-pyrrolidone, while stirring the resulting mixture, the temperature was raised to 140° C. under a stream of dry nitrogen, and the mixture was then reacted for about 6 hours, thus obtaining a polyamideimide resin solution of a resin having a number average molecular weight of 22,000.

<Adhesion>

The resin solutions obtained in the above examples and comparative example were each applied to a substrate (aluminum sheet JIS H 4000, thickness: 1 mm, unpolished) and then baked at 270° C. for 30 minutes to prepare a coated sheet having a coating film thickness of about 20 µm, and the initial adhesion was then measured.

The adhesion was measured in accordance with the old JIS K 5400 (%, cross-cut retention rate). In other words, a cutter knife was used to insert 1×1 mm square grid cuts in the test surface, thus forming 100 grid squares. A mending tape #810 (manufactured by 3M Corporation) was pressed strongly onto the grid squares, the tape was then peeled gradually away, and the state of the grid squares was inspected, with the number of retained squares among the 100 squares being calculated as a percentage. This peel test was performed 5 times, and the number of retained squares was counted for each test.

<Storage Stability>

Each of the obtained resin solutions was left to stand at 40° C. for 6 months, with the viscosity measured before and after the storage period, and the change in viscosity was investigated. The viscosity was measured in accordance with JIS C 2103 using a B-type rotational viscometer at 25° C., using a No. 4 rotor and a rotational rate of 12 rpm.

<Mechanical Properties>

Each of the above resin solutions was applied to a glass plate, subjected to heat-curing at 270° C. for 30 minutes, and then peeled from the glass plate to prepare a coating film having a film thickness of about 20 μm, a width of 10 mm and a length of 60 mm.

Using a tensile tester "Autograph AGS-5kNG" manufactured by Shimadzu Corporation, a tensile test was performed under conditions including a chuck separation of 20 mm and a tensile speed of 5 mm/minute, and the tensile strength, the elastic modulus, and the elongation percentage were determined.

The results of the above evaluations are shown in Table 1. Each adhesion result represents the average value obtained across the 5 tests.

TABLE 1

| | | Example 1 | Example 2 | Example 3 | Example 4 | Comparative Example 1 |
|---|---|---|---|---|---|---|
| Adhesion | Cross-cut retention rate, % | 100 | 100 | 100 | 100 | 100 |
| Storage stability | 40° C., 6 months, change in viscosity | +51 | +22 | +24 | +23 | +120 |
| Mechanical properties | Strength (MPa) | 115 | 133 | 151 | 121 | 106 |
| | Elastic modulus (GPa) | 3.3 | 3.9 | 4.6 | 3.1 | 2.5 |
| | Elongation percentage (%) | 8 | 7 | 8 | 9 | 14 |

Based on Table 1, it is evident that the coating films obtained using the blocked polyamideimide resins of the examples have a higher elastic modulus compared with the coating film obtained using the unblocked polyamideimide resin of the comparative example. Further, the resin solutions of the examples exhibited considerably superior storage stability compared with the resin solution of the comparative example.

This Application is related to the subject matter disclosed in prior Japanese Application 2015-243133 filed on Dec. 14, 2015, the entire contents of which are incorporated by reference herein.

It should be noted that, in addition to the embodiments already described, various modifications and alterations may be made to these embodiments without departing from the novel advantageous features of the present invention. Accordingly, it is intended that all such modifications and alterations are included within the scope of the appended claims.

The invention claimed is:

1. A coating material comprising a polyamideimide resin, a curing agent, and a solvent,
   wherein the polyamideimide resin has isocyanate groups at terminals, and at least a portion of the isocyanate groups are blocked with at least 0.02 mol and not more than 0.15 mol of an ether group-containing cyclic amine per 1 mol of the polyamideimide resin,
   wherein an amount of the curing agent is from 1 to 15 parts by mass, per 100 parts by mass of the polyamideimide resin,
   wherein the solvent consists essentially of the ether group-containing cyclic amine, and
   wherein the polyamideimide resin is produced by reacting one or more diisocyante compounds in the presence of the solvent under conditions that a molar ratio of the solvent to the one or more diisocyanate compounds ranges from 5.62 to 8.94.

2. The coating material according to claim 1, wherein the polyamideimide resin has a number average molecular weight of 12,000 to 30,000.

3. The coating material according to claim 1, wherein the curing agent comprises at least one selected from the group consisting of epoxy resins, phenol resins, melamine resins, and isocyanate compounds.

4. The coating material according to claim 2, wherein the curing agent comprises at least one selected from the group consisting of epoxy resins, phenol resins, melamine resins, and isocyanate compounds.

5. A coating material comprising a polyamideimide resin, a curing agent, and a solvent,
   wherein the polyamideimide resin has isocyanate groups at terminals, and at least a portion of the isocyanate groups are blocked with at least 0.02 mol and not more than 0.15 mol of an ether group-containing cyclic amine per 1 mol of the polyamideimide resin,
   wherein an amount of the curing agent is from 1 to 15 parts by mass, per 100 parts by mass of the polyamideimide resin,
   wherein the solvent comprises the ether group-containing cyclic amine,
   wherein the coating material comprises no co-solvent, and
   wherein the polyamideimide resin is produced by reacting one or more diisocyante compounds in the presence of the solvent under conditions that a molar ratio of the solvent to the one or more diisocyanate compounds ranges from 5.62 to 8.94.

6. The coating material according to claim 5, wherein the polyamideimide resin has a number average molecular weight of 12,000 to 30,000.

7. The coating material according to claim 5, wherein the curing agent comprises at least one selected from the group consisting of epoxy resins, phenol resins, melamine resins, and isocyanate compounds.

8. The coating material according to claim 6, wherein the curing agent comprises at least one selected from the group consisting of epoxy resins, phenol resins, melamine resins, and isocyanate compounds.

9. The coating material according to claim 1, wherein the amount of the curing agent is from 5 to 15 parts by mass, per 100 parts by mass of the polyamideimide resin.

10. The coating material according to claim 5, wherein the amount of the curing agent is from 5 to 15 parts by mass, per 100 parts by mass of the polyamideimide resin.

11. The coating material according to claim 1, wherein the ether group-containing cyclic amine includes a compound having a morpholine ring, a tetrahydro-1,3-oxazine ring, a tetrahydro-1,2-oxazine ring, or an oxazolidine ring.

12. The coating material according to claim 1, wherein the ether group-containing cyclic amine includes any one or more of morpholine, 4-methylmorpholine, 4-ethylmorpholine, N-formylmorpholine, and N-acetylmorpholine.

13. The coating material according to claim 1, wherein the curing agent comprises a melamine resin.

14. The coating material according to claim 1, wherein at least a portion of the isocyanate groups are blocked with at least 0.05 mol and not more than 0.15 mol of an ether group-containing cyclic amine per 1 mol of the polyamideimide resin.

15. The coating material according to claim 5, wherein at least a portion of the isocyanate groups are blocked with at least 0.05 mol and not more than 0.15 mol of an ether group-containing cyclic amine per 1 mol of the polyamideimide resin.

\* \* \* \* \*